United States Patent [19]

Lataix

[11] Patent Number: 5,158,213
[45] Date of Patent: Oct. 27, 1992

[54] DISPENSING BOTTLE WITH INTERNAL FLOW RATE RESTRICTION SYSTEM

[75] Inventor: Gilbert Lataix, Chatel-Guyon, France

[73] Assignee: Laboratoires Merck Sharp & Dohme-Chibret, Paris, France

[21] Appl. No.: 602,995

[22] Filed: Oct. 24, 1990

[30] Foreign Application Priority Data

Oct. 26, 1989 [FR] France .................. 89 14045

[51] Int. Cl.⁵ .............. B65D 47/18; B65D 47/36; B29C 49/00; B29D 28/00
[52] U.S. Cl. .................. 222/189; 222/212; 222/420; 222/541; 215/32
[58] Field of Search .......... 222/420, 421, 107, 212, 222/189, 541; 215/308, 32; 220/371

[56] References Cited

U.S. PATENT DOCUMENTS

| | | | |
|---|---|---|---|
| 750,637 | 1/1904 | Goetz ........................ | 215/308 |
| 2,411,435 | 11/1946 | Kirschenbaum ............ | 222/421 |
| 2,576,403 | 11/1951 | Kirschenbaum ............ | 222/421 |
| 2,874,881 | 2/1959 | Stull .......................... | 222/421 |
| 3,189,223 | 6/1965 | Mackal .................... | 222/420 X |
| 3,954,623 | 5/1976 | Hammer et al. ............ | 215/308 |
| 4,655,355 | 4/1987 | Turoff et al. ............... | 215/32 |
| 4,811,866 | 3/1989 | Golias ....................... | 222/189 |
| 5,105,993 | 4/1992 | La Haye et al. ............ | 222/189 |

FOREIGN PATENT DOCUMENTS

| | | | |
|---|---|---|---|
| 228751 | 7/1987 | European Pat. Off. ......... | 222/420 |
| 0312725 | 4/1989 | European Pat. Off. . | |
| 362911 | 4/1990 | European Pat. Off. ......... | 222/420 |
| 802873 | 2/1951 | Fed. Rep. of Germany ... | 215/308 |
| 1482555 | 6/1969 | Fed. Rep. of Germany . | |
| 2511973 | 3/1983 | France . | |
| 936867 | 9/1963 | United Kingdom ............ | 222/420 |
| 84/00707 | 3/1984 | World Int. Prop. O. . | |

Primary Examiner—Sue A. Weaver
Attorney, Agent, or Firm—William H. Nicholson; Joseph F. DiPrima

[57] ABSTRACT

A sterile packaging assembly (100) for dispensing a liquid in drops comprises a main body (101) of plastic material, having a top portion (103) with an outside thread for receiving a screw cap (104), and containing a flow rate restriction system (105) for controlling drop formation. The flow rate restriction system is positioned substantially on the axis of the main body and is held in position by a constricted portion (106) of the top portion (103) of the main body. The invention is particularly applicable to sterile packaging of pharmaceutical substances such as eye drops.

4 Claims, 5 Drawing Sheets

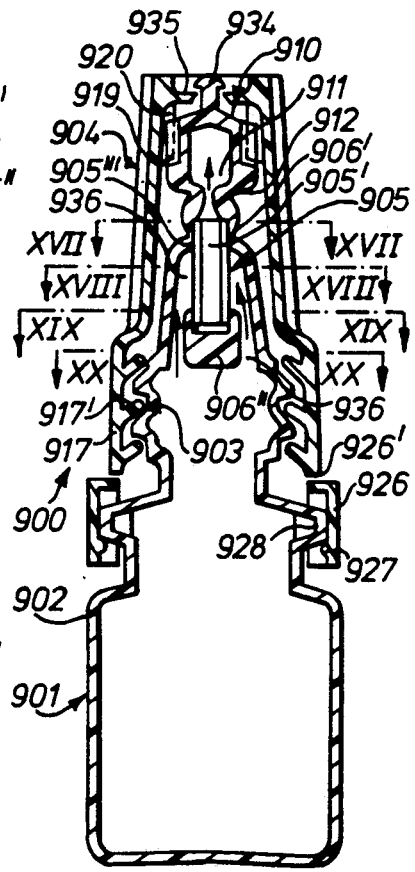

DISPENSING BOTTLE WITH INTERNAL FLOW RATE RESTRICTION SYSTEM

The invention relates to sterile packaging of a liquid, and more particularly to packaging assemblies allowing a liquid to be dispensed in drops.

A typical case is that of tamperproof and sterile packaging for eye drops, where the packaging assembly should permit easy dispensing of liquid in the form of drops, in particular in the form of regular drops without any jet.

This problem is well known to persons skilled in the art, and numerous solutions have already been proposed.

A first type of proposed solution consists of techniques for manufacturing packaging assemblies of the type referred to in the art as "bottle packs".

One such technique is known, for example, in U.S. Pat. Nos. 3,919,374 and 4,176,153.

The technique begins by extruding a preform, and then a bottle is blown after closure; thereafter the (as yet unfinished) bottle made in this way is filled, generally by means of a needle, and finally it is sealed (with this final operation being performed by means of an additional top mould).

This technique is completely satisfactory for obtaining packaging assemblies which are sterile, either with or without tamperproofing.

However, it is not suitable for obtaining satisfactory dispensing in the form of drops.

For this application, a capsule or cap is used having an inside central perforating pin. The hole formed in this way in the body of the packaging assembly does not permit drops to be formed regularly (with drop formatting depending to a large extent on the pressure exerted by the user of the packaging assembly), and in addition the liquid jet is disordered.

In a variant, it has been proposed to replace the capsule-and-pin system by a tear-off closure head (see, for example U.S. Pat. No. 4,378,891). However, the orifice obtained necessarily has a relatively large diameter (otherwise there would be a danger of the outlet channel being blocked). The flow rate is therefore very irregular as before, and the jet is relatively disordered.

Another type of proposed solution consists in using a prefabricated subassembly constituting an enpiece and a stopper.

The advantage lies in the accuracy with which the subassembly can be manufactured in advance by injection.

French patent number 2,511,973 shows several solutions of this type.

Such packaging assemblies are made by starting with a conventional bottle blowing operation followed by filling, the end-piece and stopper subassembly is then put into place, and the procedure is finished by sealing the top portion, thereby simultaneously fixing the subassembly in place (in a manner analogous to hot forming).

Sometimes sealing applies only to the bottom portion of the end-piece and stopper subassembly (eg. see FIGS. 9 to 11 of French patent number 2,511,973), which has the disadvantage that it is then possible for the stopper to be opened and to be closed. Sealing may alternatively apply to the entire end-piece and stopper subassembly by ensuring that a kind of cocoon is provided around the entire subassembly, thereby avoiding the above-mentioned disadvantage (eg. see FIGS. 25 and 26 of French patent number 2,511,973).

Such techniques making use of prefabricated subassemblies nevertheless remain expensive (two injected parts need to be made separately and then assembled, while always ensuring the required levels of cleanliness are maintained).

Another important disadvantage lies in the imperfect sealing obtained.

As already mentioned above, if the end-piece and its stopper are directly accessible, then there is a danger that the substance will no longer be sterile after the packaging assembly has been stored. This arises, in particular, because of the danger of the parts of the subassembly becoming unscrewed while being conveyed (in a vibrating bowl) and/or while they are being put into place. If a cocoon is provided, it must constitute a tear-off closure head which means that a line of weakness needs to be provided so that a patient can open the bottle, in other words a connection is provided which is partially perforated. This always results in a risk of leakage to a greater or lesser extent.

Further, it is well known that the technique of hot forming is difficult to master (eg. variations in the formed substance can spoil forming). As a result there is not only a further risk of leakage, but there is also a risk that the product does not remain sterile (and unfortunately this is not always visible from the outside).

All in all, these techniques using prefabricated subassemblies are expensive and not very satisfactory either for sealing or for sterility.

Analogous techniques of an add-on stopper may also be mentioned (see U.S. Pat. No. 4,226,334 and PCT application number WO 85/00 340, for example) and the same disadvantages as mentioned above apply.

A third type of proposed solution consists in forming a channel of very small diameter in the head of the packaging assembly (in which case persons skilled in the art use the term "microchannel" since the diameters involved are about one tenth of a millimeter to about three tenths of a millimeter).

U.S. Pat. No. 4,584,823 illustrates a solution of this type.

A very fine needle is then used for making the microchannel.

In order to manufacture packaging assemblies of this type, the procedure begins, as before, with a bottle-blowing operation and a filling operation using a mandrel which is counted in a vertical axis drum. Thereafter the mandrel is raised and the drum is located so as to bring the needle and its support into alignment with the partially formed main body. The needle is then put into place in a waiting intermediate mould and the mould is then closed in order to allow the process to continue, ie. in order to from a dispensing end-piece.

More recently, proposals have been made to improve this technique by providing two intermediate moulds (with the assembly then being completely closed by means of the third mould).

Nevertheless, this technique remains very difficult to perform, in particular because of the fragility of the needle. The needle may break or it may bend (if it breaks there is no hole, and if it bends there is a danger of leakage). This means that the needle must be monitored on a permanent basis in order to verify its condition, since it is difficult to verify that a hole is indeed present and/or that sealing is satisfactory.

Finally, mention may be made of other techniques which are more remote but which serve to illustrate the wide variety of possible solutions: these techniques are described in PCT application number WO 86/00 598, British patent number 2,053,866, German patent number 1,813,047, and U.S. Pat. Nos. 2,893,613 and 2,324,237.

The principal object of the present invention is to provide a sterile packaging assembly avoiding the above disadvantages and, more particularly, making it possible to obtain regular drop formation without forming a jet.

Another object is to produce a packaging assembly whose structure makes it possible to avoid any risk of a sealing defect which could spoil sterility.

Another object of the invention is to provide a packaging assembly which is easy to use by a patient, even when the patient is an elderly person.

Another object of the invention is to provide a packaging assembly which is simple in structure, and to implement an associated manufacturing method which is simple and advantageous with respect to production costs.

More particularly, the present invention provides a sterile packaging assembly for dispensing a liquid in drops, characterized by the fact that it comprises a main body of plastic material, having a top portion with a dispensing orifice and an outside thread for receiving a screw cap, and containing a flow rate restriction system for controlling drop formation, said system being positioned substantially on the axis of said main body and being held in position by a constricted portion of the top portion of said main body.

Preferably, the top portion extends beyond the flow rate restriction system, via the dispensing portion which is surmounted by a closure head that can be torn off in order to define a dispensing orifice on first utilization of said packaging assembly.

According to a particular embodiment, the flow rate restriction system is a small capillary tube whose central channel is delimited by two end facets.

In this case, the capillary tube may be cylindrical with a circular cross-section, otherwise it may be cylindrical with a figure eight cross-section. This is advantageous, insofar as capillary tubes are cheap and available in long lengths, thereby making it easy to automate manufacture. Suitably, the top facet of the capillary tube is inclined relative to the axis of the central channel; the jet of the liquid can thus be diverted towards the wall of the main body so that the jet broken in this way is more easily transformed into a drop (a non-inclined facet could run the risk of providing a small jet that did not form a drop).

Preferably, the top portion of the main body has a cylindrical bore beyond the top facet of the capillary tube, the bore being wider than the capillary tube in order to improve control of the size of liquid drops during utilization of said packaging assembly.

Advantageously, in this case, the dispensing portion of the main body is connected to the closure head beyond a rounded top shoulder terminating the cylindrical bore by means of an annular zone constituting a rim conferring a degree of elastic deformation in an axial direction to the main body; in particular, the rim-forming annular zone is connected to the closure head via necking making it possible to seal the main body by applying axial pressure after said closure head has been torn off.

It is also advantageous for the top portion of the main body to be terminated by a relatively narrow elongate neck constituting the dispensing portion and is surmounted by a closure head which is wider than said elongate neck; in particular, the closure head may have an outside surface with outside teeth, said teeth serving to co-operate with corresponding inside teeth of the screw cap in order to enable said closure head to be detached by unscrewing said cap (for example, the associated teeth of the closure head and of the screw cap may be in the form of axial fluting).

Also advantageously, the packaging assembly of the invention it includes snap-fastening means between the screw cap and the closure head, thereby enabling said closure head to be retained in said cap after it has been torn off by unscrewing the cap.

For example, the snap-fastening means may be essentially constituted by radial fins surmounting the closure head with radial outside edges thereof forming lugs which co-operate with an annular rim provided on the inside surface of the screw cap; in particular, it is possible to provide two radial fins situated in the join plane of the mould used for making the main body.

In the first embodiment, the screw cap is unitary, and has, at the lower end, a flexible thread which can move aside upon fitting by pressure, when the said assembly is being put together, in contact with the outer threading of the upper part of the main body.

In another embodiment, the screw cap is made of two parts which are fixed together by axial snap-fastening, said parts comprising a main part with an inside thread for screwing normally onto the top portion of the main body when said assembly is being put together, and a second part constituting a closure cap, with said second part having the toothed portion which co-operates with the outside teeth on the closure head, and a rotary drive connection being provided between said parts of said screw cap.

Advantageously, in this case, the beyond part forming the closure cap has a cylindrical sleeve penetrating into the main part of the cap, said sleeve having inside teeth for co-operating with the closure head and having outside teeth for co-operating with said main part; in particular, the associated teeth are in the form of axial fluting, said fluting further being such that the closure cap connects with the closure head prior to connecting with the main portion of the cap.

It is also advantageous, for either embodiment, for the screw cap to have a lower tamperproofing ring which is snap-fastened over the main body when said assembly is put together, the said tamperproofing ring being toothed internally in order to co-operate with the outer thread of the main body, both the upper and lower connections by associated teeth to said screw cap being homothetic in order to prevent any twisting of the closure head when the said assembly is being put together, the lower connection additionally providing for a centering of the said screw cap allowing the upper connection to be positioned without risk of twisting of the said closure head.

In another variant, the flow rate restriction system is a small capillary tube whose central channel is delimited by two end facets, and whose lower end is capped by a filter which is held in position by the constricted portion of the top portion of the main body, the mesh of said filter being chosen with respect to the desired degree of flow rate restriction. Advantageously, in this case, the edge of the filter capping the capillary tube is wedged between the said tube and the constricted portion of the upper part of the main body. Also preferably, the capillary tube is cylindrical and is circular in cross-section, and/or the top facet of the capillary tube is inclined relative to the axis of the central channel.

In another variant, the flow rate restriction system includes at least one porous tube bent into a horseshoe shape, with the two ends thereof being disposed side-by-side and parallel to the axis of the main body and being held in position by the constricted portion of the top portion of said main body.

In yet another variant, the flow rate restriction system is a porous cylindrical block disposed coaxially with the main body and held in position by the constricted portion of the top portion of said main body, the entire outside surface of said block being embedded in said constricted portion; in particular, the porous cylindrical block is preferably made of sintered polypropylene or polyethylene.

In yet another variant, the flow rate restriction system is a longitudinally fluted cylindrical core or is made in the form of a porous tube having a central channel, said system being disposed coaxially with the main body and having its working side surface embedded in a filter which is held in position by the constricted portion of the top portion of the main body by being crimped between said constricted portion and the fluted cylindrical core at each of the ends of the core, with the mesh size of the filter being selected as a function of the desired degree of flow rate restriction.

It is then advantageous for the constricted portion of the top portion of the main body to have a central deformation level with the bottom end of the fluted cylindrical core, thereby both holding said core in place and defining two axial passages for conveying liquid to the working side surface embedded in the filter. In particular, the filter may be wound through slightly more than one turn around the fluted cylindrical core in order to constitute an axial overlap layer; or else the filter may be made up of two sheets whose opposite edges are interconnected, with the two longitudinal lips being folded down.

It is also advantageous in the above-mentioned variant for the top portion of the main body to have a cylindrical bore beyond the top end of the flow rate restriction system, said bore being of greater width for the purpose of improving control of the size of liquid drops during utilization of said assembly.

Also preferably, the dispensing portion of the main body may be connected to the closure head beyond a rounded top shoulder by means of a conically flared annular zone. Advantageously, the top portion of the main body is terminated by a dispensing end-piece which is surmounted by a hat-shaped closure head which is wider than said end-piece; in particular, the closure head has an outside surface with outside teeth for the purpose of co-operating with corresponding inside teeth of the screw cap in order to cause said closure head to be detached when said cap is unscrewed, with the associated teeth being in the form of axial fluting.

Also preferably, the packaging assembly includes snap-fastening means between the screw cap and the closure head, thereby enabling said closure head to be retained in said cap after the head has been torn off by unscrewing the cap; for example, the snap-fastening means is essentially constituted by a spike in the form of an arrowhead surmounting the closure head and suitable for co-operating with transverse lugs or a transverse web in the screw cap.

Advantageously, the screw cap is unitary, and has, at the lower end, a flexible thread, which can move out of the way on coming into contact with the outside thread of the top portion of the main body while the assembly is being put together by applying axial force; in particular, the screw cap has a bottom tamperproofing ring which snap-fastens onto the main body when the assembly is put together, the said tamperproofing ring having internal teeth in order to cooperate with a corresponding outer teeth of the said main body, both the upper and lower connections by associated toothings to the said screw cap being homothetic in order to prevent any twisting of the closure head when the said assembly is being put together, the lower connection additionally providing for a centering of the said screw cap allowing the upper connection to be positioned without risk of twisting of the said closure head.

The invention also provides a method of manufacturing a plastic sterile packaging assembly of the above type, the method being characterized by the fact that it comprises the following stages:

a bottom portion of a main body is made by blowing in a main mould, said bottom portion being intended to contain the liquid to be dispensed, after which said main body is filled;

a flow rate restriction system is positioned substantially on the axis of the main body by temporary support means;

the flow rate restriction system is held in place in a mould head which clamps a portion of the main body onto said system on being closed.

According to another advantageous variant of the manufacturing method, after the stage of positioning of the flow rate restriction system, the following successive steps are additionally carried out:

a closure head is made in a sealing mould in order to terminate the main body; and a screw cap is put into place, thereby coupling the closure head in rotation with said cap.

Other characteristics and advantages of the invention appear more clearly in the light of the following description of various particular embodiments, made with reference to the accompanying drawings, in which:

FIG. 15 is a section through another variant in which the flow rate restriction system is a fluted cylindrical core whose working surface is embedded in a filter (with the main body having a central deformation at the bottom end of the embedded core, as can be seen more clearly by referring also to the side view in section of FIG. 16);

FIGS. 17 to 20 are sections respectively on XVII—XVII, XVIII—XVIII, XIX—XIX, and XX—XX of FIG. 15 for facilitating understanding of the special shape of the body of the assembly;

FIGS. 21 and 22 are sections showing how the fluted core is covered by a filter, respectively in the case of a single overlap and in the case of two folded-down lips; and FIG. 23 is a diagrammatic view of an apparatus which makes it easy to cut and grasp lengths of capillary tube.

Figure 1:
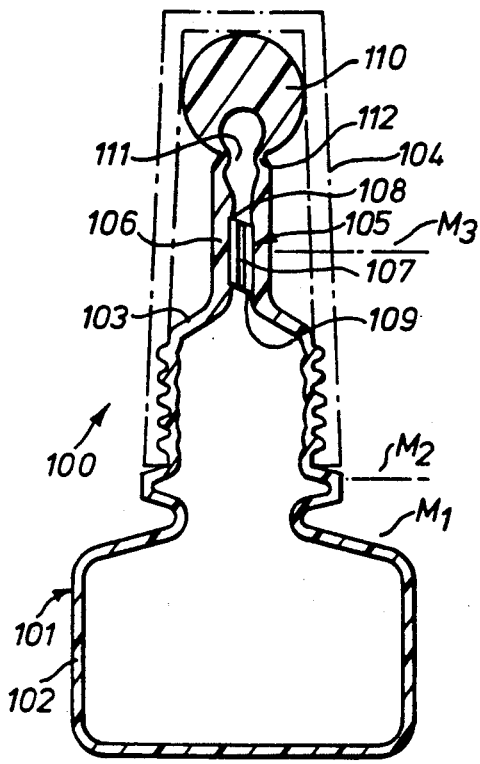
FIG. 1 is an axial section through a sterile packaging assembly in accordance with the invention, in which the flow rate restriction system is a small cylindrical capillary tube, and the screw cap is outlined, in this case, in dot-dashed lines.

FIG. 1 shows a sterile packaging assembly 100 in accordance with the invention for dispensing a liquid in drops. The packaging assembly 100 comprises a main body 101 of plastic material whose bottom portion 102 constitutes a bottle portion per se for receiving the liquid to be dispensed, and whose top portion 103 has an outside thread for receiving a screw cap 104.

In accordance with an essential aspect of the invention, the top part of 103 of the main body 101 has an internal flow rate restriction system 105 for controlling drop formation, said system being disposed substantially on the axis on the main body 101 and being held in position by a constricted portion 106 of the top portion 103 of said main body.

It is particularly advantageous for the top portion 103 to extend beyond the flow rate restriction system 105 via a dispensing portion covered by a closure head 110 in the form of a flat disc which can be torn off to define a dispensing orifice 111 on the first occasion that said packaging assembly, 100 is used.

The flow rate restriction system is constituted in this case by a small capillary tube 105 whose central channel 107 is delimited by two end facets 108 and 109. In this case, the capillary tube 105 is cylindrical and is circular in cross-section, however this is merely by way of example, as shown below. Such an embodiment is particularly advantageous in that capillary tubes are cheap and are available in long lengths, thereby making it easy to automate manufacture, as described below.

As can be seen in FIG. 1, the top facet 108 of the capillary tube 105 is inclined relative to the axis of the central channel 107 (the bottom facet 109 is also inclined in this case, but that is merely the consequence of a simplification to the way in which the small capillary tube is manufactured). As a result, the jet of liquid can thus be diverted towards the wall of the main body 101 so that the jet which is broken down in this way transforms itself more easily into a drop.

The closure head 110 is connected to the dispensing portion of the main body 101 via an annular zone constituting a rim 112, this improving the geometry at the level of the dispensing orifice 111.

The flattened closure head 110 can be easily detached manually by twisting, after unscrewing the cap 104 protecting the said closure head. It is also possible to provide a rotational connection between the closure head 110 and the screw cap 104 when the packaging assembly is being put together (for example by gluing or welding at the level of the opposite surface, after positioning of the screw cap), thereby making it possible to entrain the closure head 110 when the cap 104 is unscrewed, thus tearing the annular zone 112 and releasing a central orifice 111 for dispensing liquid.

Dot-dashed lines diagrammatically indicate the presence of moulds used in the manufacture of the packaging assembly 100. It can thus be seen that there is a main mould M1, a capillary tube holding mould M2, and a sealing mould M3. Typical stages in the manufacturing method are described in greater detail below with reference to FIGS. 11a and 11b.

However, the major advantages provided by such a disposition in accordance with the invention can already be seen: the small capillary tube 105 makes it easy to obtain regular drop formation without a jet; and the tear-off head 110 ensures that the system remains sterile and sealed. Further, the capillary tube is cheap (it is possible to use long extruded capillary tubes of the type used in aerosol manufacture, for example). By way of comparison, such a small capillary tube is about 30 times cheaper than an injected end-piece and stopper subassembly as used in certain prior art techniques mentioned above.

Drop formation is completely controlled. The flow rate restriction system constituted in this case by the capillary tube 105 is particularly effective in controlling the flow rate, given that it is easy to form a microchannel 107 in such a tube. Drop size is essentially a function of the geometrical shape of the dispensing end, and overall results are very satisfactory.

It should be observed that the axial fixing of the small capillary tube 105 is not critical in any way for obtaining satisfactory drop-forming qualities. This facilitates manufacture, particularly when the capillary tube is held in position by the constricted portion 106 (with such fixing being equivalent, in fact, to welding, particularly if materials of the same nature are used, such as polyethylene).

However, it should be observed that, when using a packaging assembly exactly as shown in FIG. 1, the quality of the result is not optimal with respect to drop size, and this is essentially due to the special shape of the dispensing portion of the main body 101 beyond the capillary tube 105.

Figure 2:
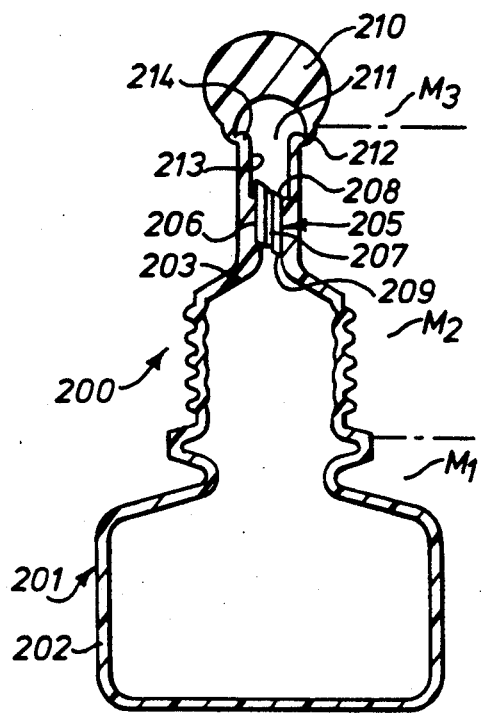
FIG. 2 shows a variant of the above assembly with a cylindrical bore being provided above the capillary tube, thereby improving liquid drop size control during use of said assembly.

The purpose of the variant shown in FIG. 2 is specifically to overcome this drawback. The packaging assembly 200 has a large number of features in common with the packaging assembly 100 as described above, and such common features are therefore given the same references as above, plus one hundred.

The essential difference compared with the previous variant lies in the shape of the dispensing portion of the main body 201. It can be seen that the top portion 203 of the main body 201 has a cylindrical bore 213 beyond the top facet 208 of the capillary tube 205 which is wider than the outside diameter of the capillary tube, thereby quite substantially improving control of the size of liquid drops when said packaging assembly is used. Further precautions are taken with geometrical shape at the dispensing orifice 211. In this case the cylindrical bore 213 is terminated by an outwardly directed annular rim 214, and the weak annular zone 212 interconnecting the tear-off head 210 and the main body 201 lies on the outside of the rim.

The improved geometrical shape provides a quite substantial improvement in drop accuracy, and this constitutes a considerable advantage even though the size of the drop is bigger than before, thus leading to a quantity of liquid being dispensed which may be greater than the quantity strictly necessary. It should be also observed that the formation of the cylindrical bore 213 and the top annular rim 214 naturally makes manufacture somewhat more complicated (it becomes necessary to provide a suitably shaped grasping system, as described below).

Figure 3:
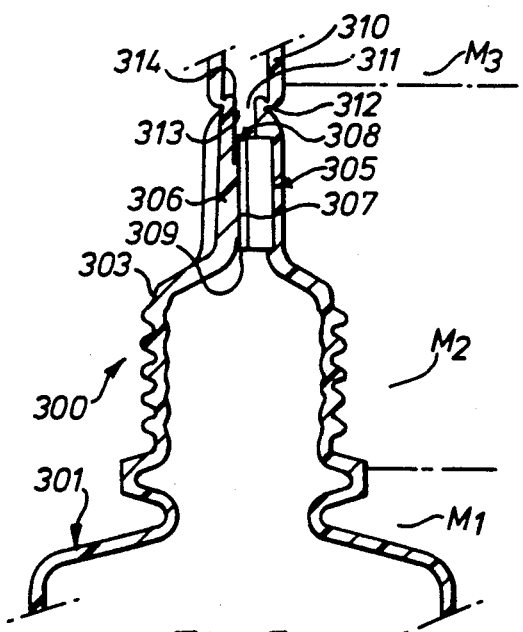
FIG. 3 shows another variant in which the cross-section of the capillary tube has a figure eight shape as can be seen in FIG. 4, which also specifies section line III—III of FIG. 3 in greater detail.

The variant shown in FIG. 3 makes it possible to remedy the drop size problem when very high accuracy is desired in this respect.

Figure 4:
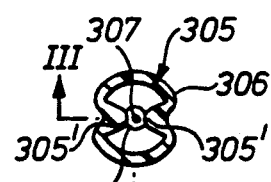

The packaging assembly 300 comprises, as before, a main body 301, with a top portion 303 having an outside thread, said top portion being extended by a constricted portion 306 for holding a flow rate restriction system 305 in position. The essential difference compared with the above-described embodiment lies in the special shape of the flow rate restriction system 305 which is constituted in this case by a small cylindrical capillary tube having a figure eight crosssection (the section of FIG. 4 shows this particular sectional shape more clearly). This section makes it possible to take advantage simultaneously of having both a small and a large outside diameter. The small diameter makes it possible to obtain a drop which is small in size, while the large diameter in the other direction makes it possible to retain sufficient substance for good mechanical behavior and ease of grasping during manufacture. Further, as above, it is advantageous to cause the top facet 308 of the capillary tube 305 to be inclined relative to the axis of its central channel 307. Further as for the variant shown in FIG. 2, there is a cylindrical bore 313 beyond the capillary tube 305 which is terminated by an annular rim 314 at the dispensing orifice 311.

Figures 5, 6:
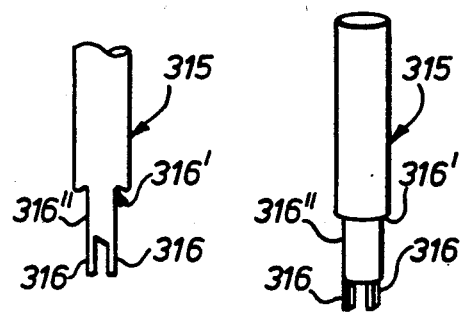
FIGS. 5 and 6 show the gripping mandrel used in this case for installing the figure eight section capillary tube.

FIGS. 5 and 6 show the bottom end of an end-piece 315 serving as a grasping system when using a capillary tube of the same type as above-described tube 305. The end-piece 315 has an annular shoulder 316 whose function is to define a smaller diameter cylindrical portion 316 during moulding of the annular rim 314 for the propose of defining a bottom cylindrical bore 313, and finally two lugs 316 for holding a length of capillary tube 305 by means of its small diameter portion.

Naturally, in some cases, it may be advantageous to provide an outside thread on the portion 306 of the main body 301 for the purpose of screwing on a stopper after the head 310 has been removed. FIG. 4 also makes it possible to understand the special shape of the portion 306 of the main body which results from using a capillary tube 305 having a figure eight cross-section. It should also be observed that the section of FIG. 3 comprises a left half section in a plane perpendicular to the opening plane of the mould M2, whereas the right half-section corresponds to a section in the opening plane of said mould.

FIGS. 7 to 10 show variants of the invention in which the top portion of the main body is terminated by a relatively narrow elongate neck constituting the dispensing portion which is surmounted by a closure head which is wider than said elongate neck, said closure head also having an outside surface with outside teeth for the purpose of co-operating with corresponding inside teeth on the screw cap in order to detach said closure head by unscrewing said cap.

It should be observed that in prior techniques using a tear-off head, the head has been torn off by hand, such that the packaging assembly could not be reclosed, thus requiring the use of a separate stopper, preassembled or otherwise. This gives rise to a succession of operations that can be difficult for some patients who must, in succession: open the cap; tear off the head; remove the head; and then reclose the assembly. Persons skilled in the art then encounter a well-known problem: if the tear-off head is small in diameter, then it is difficult to handle; whereas if it is large in diameter, then although it is easier to handle, a preassembled separated cap or stopper is required.

Thus, in accordance with an advantageous embodiment of the invention, a screw cap is provided which performs two functions ie. not only does it provide initial opening by tearing off the head, it also allows the packaging assembly to be reclosed. However, it should be observed that an additional difficulty needs to be overcome in this case, namely to ensure that under no circumstances can the head be torn off prior to the screw cap being unscrewed on the first occasion that the packaging assembly is used. It is therefore necessary to ensure that the forces which may be communicated from the screw cap to the tear-off head when the screw cap is being put into place are kept small, and in particular that twisting forces are kept small.

Figure 7:
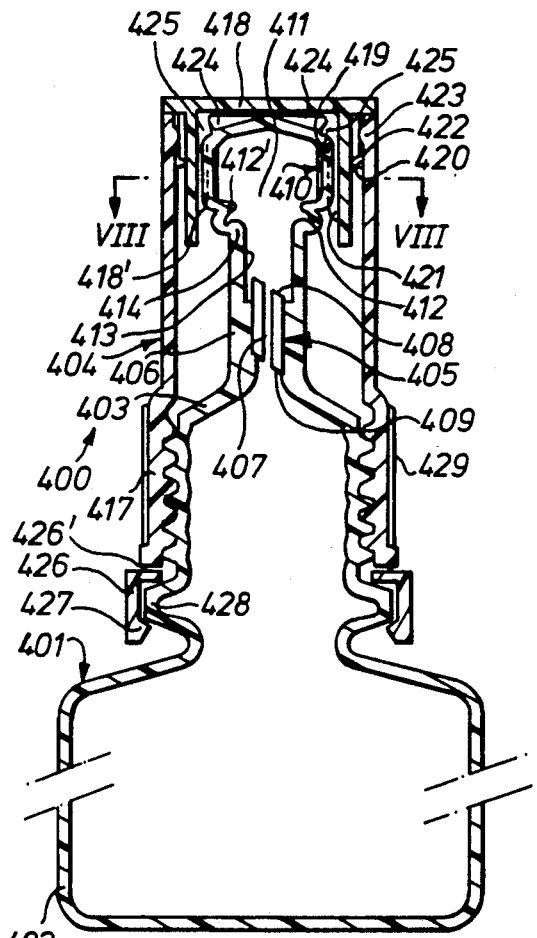
FIG. 7 shows another variant in which the closure head has outside teeth, with the screw cap being in two parts in this case.
Figure 8:
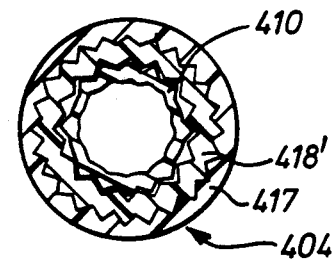
FIG. 8 is a section on VIII—VIII of FIG. 7 showing the two rotary connections via axial fluting.

The packaging assembly 400 shown in FIGS. 7 and 8 includes portions which are common with the assemblies described above, and in order to avoid overloading the description, these portions are given corresponding reference numerals in the four hundreds.

The dispensing portion of the main body 401 is connected to the closure head 410 beyond a rounded top shoulder 414 which terminates the cylindrical bore 413 by means of an annular zone constituting a rim 412 and which imparts a degree of elastic deformation in an axial direction to the main body 401. The annular zone forming the rim 412 is also connected to the closure head 410 by necking 412 which makes it possible to seal the main body 401 by applying axial pressure after said closure head has been torn off. In addition, the top portion 403 of the main body 401 terminates in the form of a relatively narrow elongate neck constituting the dispensing portion and closed by a closure head 410 which is wider than said elongate neck, with said closure head 410 having an outside surface 419 with outside teeth for the purpose of co-operating with corresponding inside teeth 421 on the screw cap 404 so as to ensure that said closure head is detached when the screw cap is unscrewed. The cooperating teeth of the closure head 410 and of the screw cap 404 are advantageously in the form of axial fluting.

In this case, the screw cap 404 comprises two parts 417 and 418 which are fastened together by axial snap-fastening. A main part 417 has an inside thread for being screwed in the normal manner onto the top portion 403 of the main body 401 when the assembly is being put together, and a second part 418 constituting a closure cape, said second part having the toothed portion which co-operates with the outside teeth on the closure head 410. Naturally, a rotary drive connection must be provided in this case between the two portions of the screw cap. Thus, the second part constituting the closure cap 418 has a cylindrical sleeve 418 which penetrates into the main part 417 of the cap 404, said sleeve having inside teeth for co-operating with the closure head 410 (axial fluting 422 on the sleeve 418 and corresponding axial fluting 420 on the main part 417). It should be observed that lugs 423 are provided on the inside of the main part 417 in order to provide axial snap-fastening with a corresponding groove in the second part constituting the closure cap 418.

It is also advantageous to provide snap-fastening means between the screw cap 404 and the closure head 410 for retaining said closure head in the cap after the head has been torn off by the cap being unscrewed. In this case, the snap-fastening means is essentially constituted by radial fins 424 on top of the closure head 410 with the radially outer edges thereof constituting lugs which co-operate with an annular rim 425 provided on the inside surface of the screw cap 404. It is preferable to provide two radial fins 424 situated in the join plane of the mould used for making the main body 401. In this case it is preferable to ensure that the associated teeth are in the form of axial fluting organized in such a manner that the connection between the closure cap 418 and the closure head 410 takes place prior to the connection between said closure cap and the main part 417 of the screw cap 404. It may also be observed that the main part 417 of the screw cap 404 has a tamperproofing ring 426 at its bottom end which has a toothed inside surface (preferably with axial fluting not shown here), with connection taking place via points 426', said ring snap-fastening by means of a circular groove 427 therein over a swelling 428 of the main body 401 when said assembly is put together, in order to cooperate with a corresponding outer toothing of the main body 401 when the packaging assembly is put together. In this case it is expedient to ensure that the two upper and lower connections by teeth associated with the screw cap 404 are corresponding in order to avoid any twisting of the closure head 410 when the packaging assembly is being put together, the lower connection additionally affording a centering of the screw cap 404 permitting correct positioning of the upper connection without risk of twisting of the said closure head 410.

Once the main body 401 has been made together with its capillary tube 405 and its tear-off closure head 410 with outside teeth, the screw cap 404 should be put into place. This is begun by putting the main part 417 into place by screwing it onto the main body 401 until the tamperproofing ring 426 snap-fastens, after which the part 418 forming the closure cap is put into place solely by applying twist to the closure head 410. Once the closure cap 418 has snap-fastened onto the main part 417, then said cap is certain to have snap-fastened properly to the closure head 410 via the radial fins thereof, with the elasticity in the axial direction conferred by the interconnecting rim 412 preserving flexibility of the system. In addition to ensuring that the assembly is tamperproof, it should be observed that this disposition makes it possible to centre the closure head 410 axially, with centering taking place progressively, initially by means of the closure cap 418 engaging the closure head 410 axially (through an angle corresponding in this case to 1/12th of a turn), and subsequently by the main part 417 on the preceding subassembly (in which case the angle is about 1/48th of a turn), thereby ensuring that no twist forces are transmitted to the closure head 410.

A practical advantage of making the screw cap 404 in two parts needs to be underlined, namely: the two parts can be made in different colours, thereby enabling a packaging assembly to be readily identified by a patient. Handling can be further facilitated by providing longitudinal ribs 429 on the outside surface of the main part 417 of the screw cap 404.

It should be observed that after the cap 404 has been unscrewed for the first time, and the head 410 has been separated, the necking 421 of said head (which head is retained inside the screw cap) serves during subsequent closure to reseal the packaging assembly by bearing against the annular rim 414.

Figure 10:
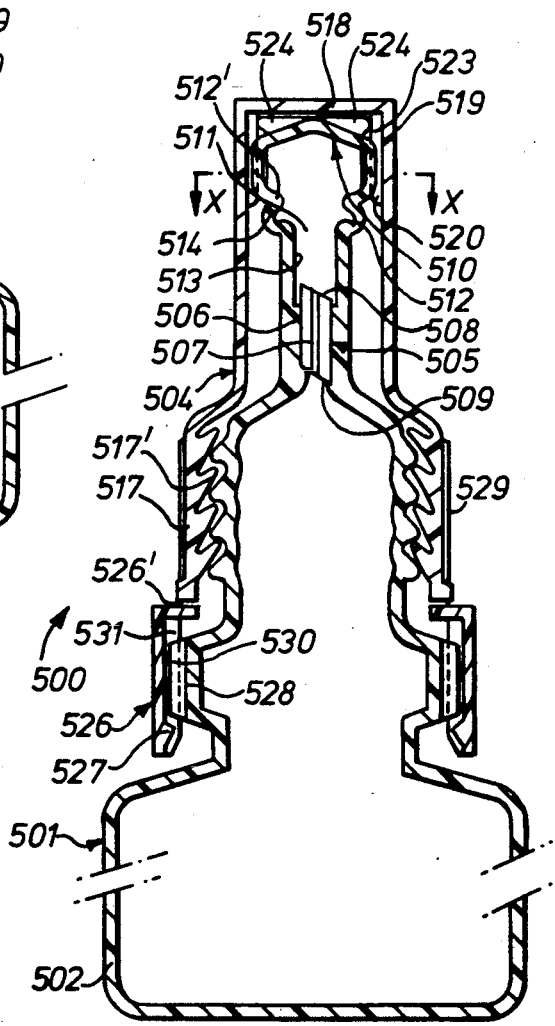
FIG. 10 is a section on X—X of FIG. 9 showing the rotary connection via axial fluting.
Figure 9:
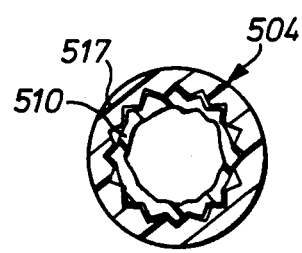
FIG. 9 shows a variant of the above assembly in which the screw cap is unitary, in which case it is put into place by applying axial force (the cap has, at end, a flexible thread which moves out of the way while the force is being applied).

FIGS. 9 and 10 show a variant of the abovedescribed embodiment, with the screw cap in this variant no longer comprising two parts, but being constituted by a single part.

In order to avoid overloading the description, parts which are identical or which correspond to above-closure described parts are given the same reference numerals plus one hundred.

The packaging assembly 500 thus includes a unitary screw cap 504, ie. the top part 518 thereof is integrally formed with its main part 517. This simplifies making the connection between the screw cap 504 and the closure head 510 somewhat: in this case is suffices to provide axial fluting 520 on the inside surface of the screw cap for the purpose of co-operating with outside teeth 519 on the closure head 510. In addition, there is only one axial snap-fastening system at this point, ie. that provided by a rim 523 on the screw cap and the by lugs provided at the ends of the radial fins 524 on the closure head 510.

However, the bottom thread of the cap 504 needs to be modified so as to make it possible to put said cap into place on the main body 501. To this end, the bottom of the screw cap 504 has teeth 517 which can be moved out of the way by applying an axial force when the packaging assembly is being put together, ie. the teeth are deflected on contact with the outside thread on the top portion 503 of the main body 501. It is then particularly advantageous to ensure that the two connections with the screw cap provided by associated teeth (ie. connection via top fluting 519 and 520, and via bottom fluting 530 and 531) are geometrically similar so as to prevent any twisting of the closure head while said assembly is being put together.

Once the main body 501 has been made, then the cap 504 can be put into place merely by applying axial force and the various coupling connections are achieved without any risk of twisting the closure head 510. As above, it is also advantageous to ensure that the bottom connection (ie. at the tamperproofing ring) take place prior to the top connection (at the closure head).

In both of the variants described above with reference to FIGS. 7 to 10, it may be observed that clearance is provided in the axial direction between the screw cap and the top portion of the main body, said clearance being necessary to make it possible to reclose the packaging assembly after it has been used for the first time.

Figure 11B:
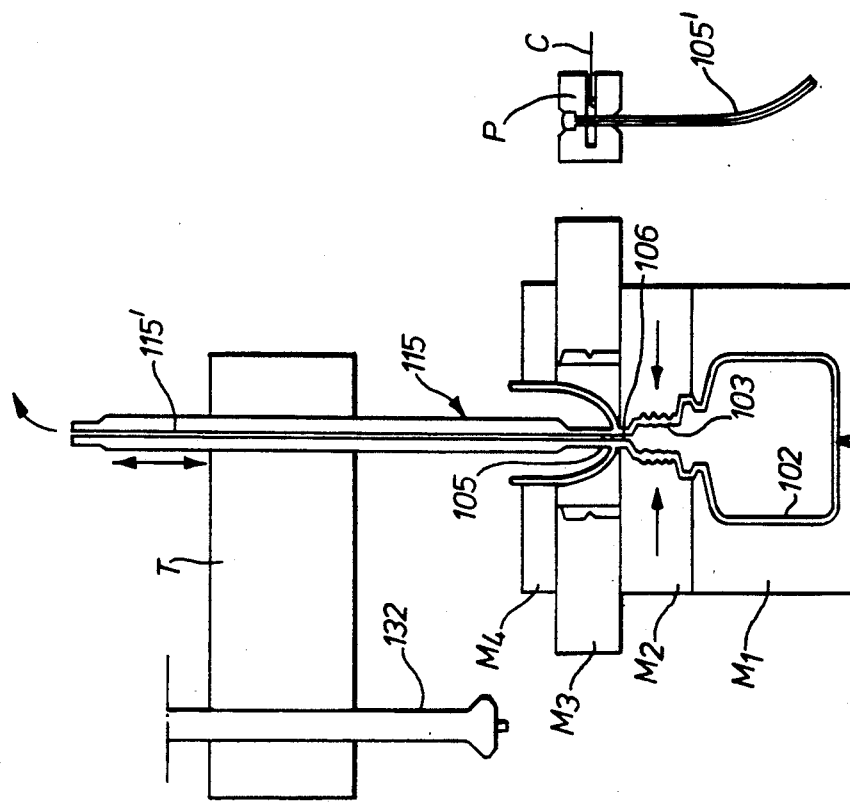
FIGS. 11a and 11b are diagrammatic sections showing the method of manufacturing an assembly of the above type, with FIG. 11a corresponding to preliminary blowing and filling operations and FIG. 11b corresponding to subsequent operations of installing the capillary tube and final sealing.
Figure 11A:
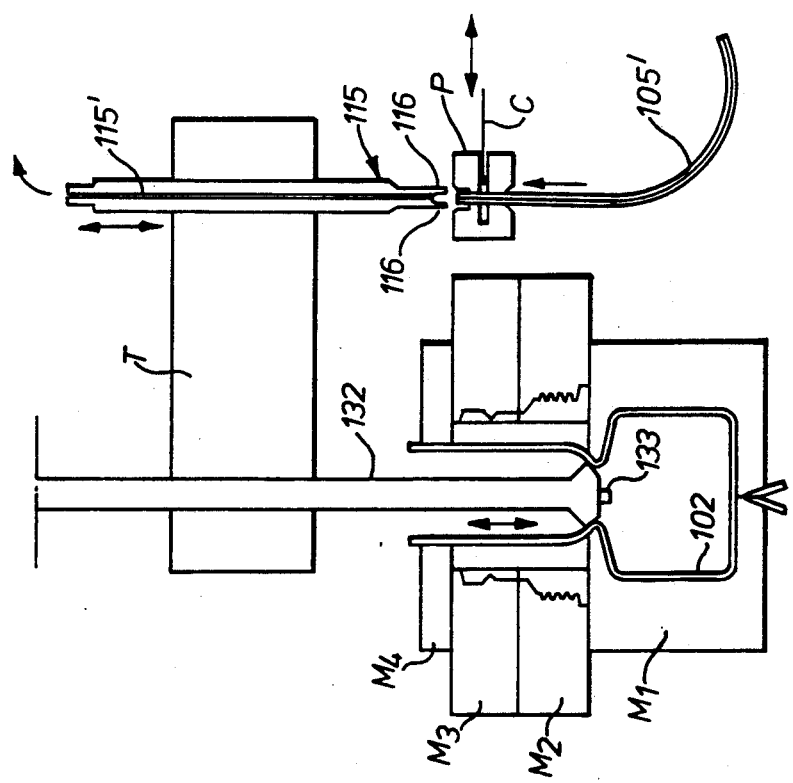

FIGS. 11a and 11b are diagrams showing how an assembly of the above type is manufactured, with FIG. 11a corresponding to initial operation of for blowing the bottle and filling it, and FIG. 11b corresponding to subsequent operations of installing the capillary tube and final sealing.

A set of four moulds can be seen, said set comprising the main mould M1, the head mould M2, the sealing mould M3, and finally parts M4 for holding the preform. Naturally members M2, M3, and M4 include suction means in the manner conventional in this field. There is also a slide T which is movable in translation or in rotation and which serves to support both a mandrel 13 for performing functions relating to blowing the bottom portion of the packaging assembly and to filling it via an associated rod 133, and an end-piece 115 of a grasping system for holding the capillary tube which constitutes the flow rate restriction system. This end-piece 115 includes a central channel 115 for exerting suction by means of a connection to an external vacuum source (not shown) and also having bottom tabs 116 for holding the capillary tube. Both the mandrel 132 and the end-piece 115 are naturally capable of performing translation motion in a vertical direction. The FIG. also shows an assembly P constituting a positioning and advancing clamp for the capillary tube, with the tube arriving in the form of a continuous length 105 and with the assembly P including a blade C for cutting off the desired lengths of capillary tube.

In the position of FIG. 11a, the mandrel 132 is used for performing blowing and filling operations, and simultaneously the end-piece 115 is lowered, the capillary tube is advance, a desired length is cut from the end thereof, and the cut-off length is grasped. The members are then moved to the position shown in FIG. 11b: the end-piece 115 is then used to place the capillary tube 105 in the desired position, after which the head mould M2 is closed, thereby simultaneously partially shaping the top portion of the main body of the packaging assembly and holding the capillary tube in place by means of the constricted portion 106. The final stage (not shown) takes place after the end-piece of the grasping system has been raised, and consists in closing the sealing mould M3, thus shaping the closure head of the packaging assembly. Naturally the two workstation configurations are organized to operate in overlapping periods so that the automated process takes place at optimum efficiency.

Figure 14:
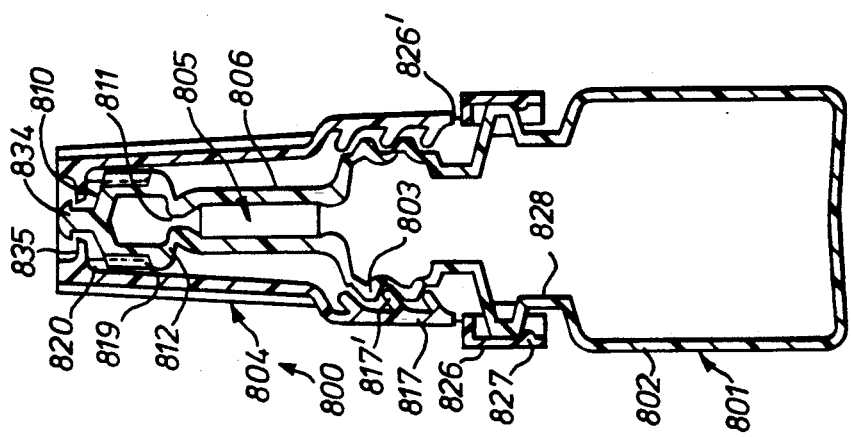
FIGS. 12 to 14 are sections through other variants in which the flow rate restriction systems are respectively constituted by: a capillary tube whose bottom end is capped by a filter; a porous tube folded into a horseshoe shape; and a porous cylindrical block.
Figure 13:
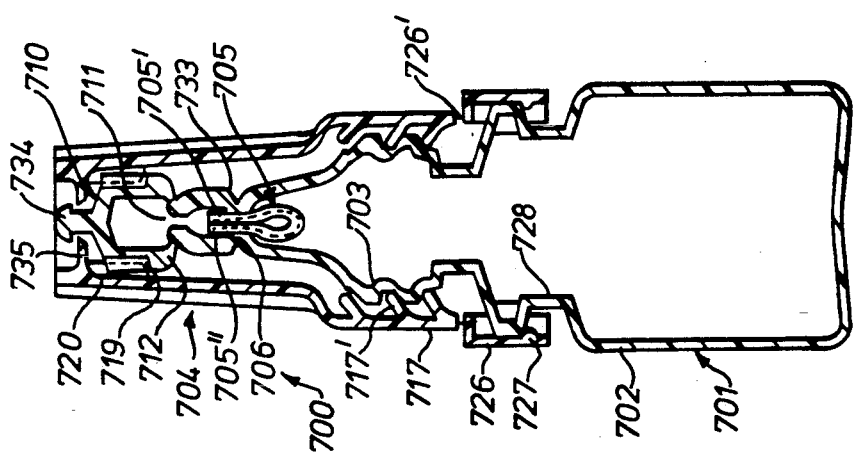
Figure 12:
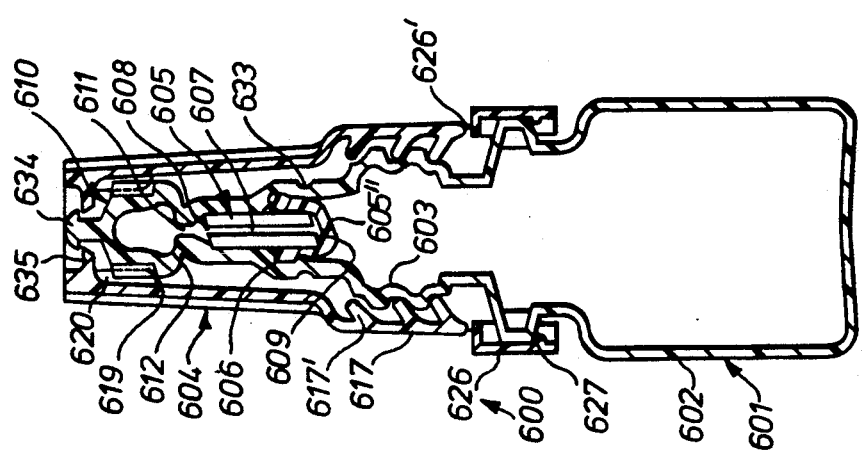

FIGS. 12 to 14 show other variants of the invention in which the flow rate restriction system differs considerably from the simple capillary tube of the above-described variant. The variants of FIGS. 12 to 14 show that the invention is not limited to a particular type of flow rate restriction system, which system may have numerous different forms.

Packaging assembly 600 shown in FIG. 12 includes numerous portions which are identical or analogous to portions in the variant described above with reference to FIGS. 9 and 10. In order to avoid overloading the description, these portions are given the same reference numerals plus one hundred.

The essential difference compared with the preceding variant lies in the structure of the flow rate restriction system 605. This system is constituted by a small capillary tube 605' (analogous to the capillary tube described above) whose central channel 607 is delimited by two end facets 608 and 609 and whose bottom end is capped by a filter 605" which is held in place by the constricted portion 606 of the top portion of the main body 601, with the mesh size of the filter being selected as a function of the desired degree of flow rate restriction. It is naturally advantageous to ensure that the edge of the filter 605" overlying the capillary tube 605' is crimped between said tube and the constricted portion 606 of the top portion of the main body 601. It is important to observe that the filter 605" performs two functions: it acts essentially as a flow rate restriction system (making is possible to obtain a low flow rate regardless of the pressure exerted by the patient on the main body of the packaging assembly), and secondly it also acts as a filter. For example, a relatively thin filter may be used (thickness of less than 1 mm), optionally having an additional pre-filter layer for imparting greater mechanical strength thereto.

A groove 633 can be observed in the top portion of the main body in the side wall level with the filter 605" which should be pressed firmly against the side surface of the bottom end of the capillary 605'. Further, and as before, the capillary tube 605' may be cylindrical with a circular cross-section, having a top facet 608 which is inclined relative to the central channel 607.

Naturally, it would be possible to provide for the top portion 603 of the main body 601 to have a cylindrical bore of larger diameter beyond the top end of the flow rate restriction system 605 in order to improve control of the size of liquid drops when the assembly is in use.

In addition, the dispensing portion of the main body 601 is connected to the closure head 610 beyond a top rounded shoulder provided at the dispensing orifice 601 via a conically flared annular zone 612.

More precisely, the top portion 603 of the main body 601 is connected to the closure head 610 which is wider than said end-piece. Further, as in the preceding variants, the closure head 610 advantageously has an outside surface 619 with outside teeth so as to be able to co-operate with corresponding inside teeth 620 on the screw cap 604 for the purpose of detaching said closure head by unscrewing said cap, with the associated teeth preferably being in the form of axial fluting 619 and 620.

It is also advantageous to provide snap-fastening means between the screw cap 604 and the closure head 610 enabling the closure head to be retained inside the screw cap after it has been torn off by the cap being unscrewed. In this case, the snap-fastening means is essentially constituted by an arrowhead shaped top spike 634 projecting upwards from the top of the hat-shaped closure head, and suitable for co-operating with transverse tabs or a transverse web 635 in the screw cap 604.

Finally, the screw cap 604 in this case is a unitary member, and has bottom teeth 617 suitable for moving out of the way under axial pressure on making contact with the outside thread of the top portion of the main body 601 while the assembly is being put together. The screw cap 604 has a bottom tamperproofing ring 626 with a smooth inside that snap-fastens onto the main body 601 when the assembly is put together.

The variant shown in FIG. 13 differs from the above-described variant with respect to the structure of its flow rate restriction system, and as a result parts which are identical or analogous to those already described are given the same references plus one hundred.

The packaging assembly 700 thus comprises a flow rate restriction system 705 which is made in the form of at least one porous tube bent into a horseshoe shape (in this case there is only one tube), with the two ends 705' and 705" of the horseshoe being disposed side-by-side, extending parallel to the axis of the main body 701, and being held in place in the constricted portion 706 of the top portion of the main body 701. The bent porous tube is preferably made of sintered polypropylene or polyethylene.

FIG. 14 shows another variant in which the packaging assembly 800 includes a flow rate restriction system 805 in the form of a porous cylindrical block, said block being disposed coaxially with the main body 801 and being held in position by the constricted portion 806 of the top portion of said main body, with said constricted portion enclosing the entire side surface of said block. The porous cylindrical block 805 is preferably made of sintered polypropylene or polyethylene. The other members of the packaging assembly 800 are identical to those in the preceding embodiments, and as a result, the corresponding references have merely been increased by one hundred.

FIGS. 15 to 22 show yet another variant in which the packaging assembly 900 comprises a flow rate restriction system 905 in the form of a cylindrical core 905' having longitudinal fluting, disposed coaxially with the main body 901, and having a working outside surface which is embedded in a filter 905" which is held in position by the constricted portion 906 and by the top portion of the main body by being wedged between said constricted portion and the fluted cylindrical core at each end of the core, with the mesh size of the filter being selected, as in the variant of FIG. 12 as a function of the desired degree of flow rate restriction.

However, the main body of the packaging assembly 900 differs from the previously described variant in that the constricted portion 906 of the top portion of the main body has a central deformation 906" at the bottom end of the fluted cylindrical core 905', thereby serving both to hold said core in place and also to define two axial passages 936 for conveying liquid towards the working outside surface which is embedded in the filter 905'. The section views associated with FIG. 15 facilitate understanding the organization of the modified structure of the main body, and in particular understanding how the two axial passages 936 are disposed.

FIG. 21 shows a variant in which the filter 905" is wound round the fluted cylindrical core 905' through slightly more than one complete turn, thereby providing an axial overlap zone 905'''. FIG. 22 shows another variant in which the filter 905" is made up of two sheets whose opposite edges are connected together with the two longitudinal lips $905_1'''$ and $905_2'''$ are folded down over the fluted cylindrical core 905'.

Naturally all sorts of cross-sectional shapes could be used for the cylindrical core 905' (e.g. it could be oval, or star-shaped, etc.). Suitable materials for such cylindrical cores include any extrudable material such as polyethylene, polypropylene, or polyamide. The filter 905" in which the cylindrical core 905' is embedded may be made of a plastic material (preferably sintered polypropylene or polyethylene), or else it may be made of metal or glass.

Such a disposition provides a highly advantageous ratio between total bulk and the area of the flow rate restriction working surface.

Finally, FIG. 23 is a diagrammatic view of an apparatus for cutting off and grasping lengths of capillary tube in an easy manner, regardless of the shape of the tube cross-section.

The apparatus 150 is essentially constituted by a fixed body 170 containing a rotary cylinder 152 disposed about an essentially horizontal axis. The left of the figure shows a fixed clamping assembly constituted by a top jaw 153 and a bottom jaw 151 which is constituted, in this case, by an extension of the apparatus body 170. A moving clamping assembly is also provided in for form of a top jaw 154 and a bottom jaw 155. This moving clamping assembly serves to advance the capillary tube 105' which is presented in the form of a long continuous tube. The cylinder 152 has a bore 152' for receiving a length of capillary tube until the tube comes into abutment against a feeler 159 mounted to move in translation in a housing. A feeler brake 163 is also provided which is pressed against the feeler 159 by means of a spring 164, and the pressure applied by the spring can be adjusted by means of a screw 165. The bottom of the apparatus body 170 includes a feeler pusher 161 constituted in this case by a rack whose motion is controlled by a pusher control 162 in the form of a toothed wheel. The top of the apparatus body includes and outlet orifice 158 and the end-piece of the grasping system 115 comes into alignment with the axis of the outlet orifice 158 with it suction channel 115' being disposed coaxially with the orifice. The apparatus body 170 also includes a fixed blade C which is fixed by a bolt 156, said blade being disposed in such a manner that rotation of the cylinder 152 automatically causes a length of capillary tube to be cut off with a facet which is inclined relative to the axis of said tube, i.e. relative to the central microchannel thereof. That is why the end facet 159' of the feeler 159 against which the conveyed capillary tube 105' comes into abutment is likewise inclined in corresponding manner. Finally, suction means 157 are disposed in the apparatus body 170 for sucking up particles due to cutting.

When in operation the apparatus 150 performs the following successive stages when in operation:

advance the capillary tube 105', and during the advance stage of the moving clamping assembly, the jaws 151 and 153 of the fixed clamping assembly remain open while the jaws 154 and 155 of the moving clamping assembly are closed;

check that the capillary tube is present in an appropriate position: the capillary tube 105' pushes against the feeler 159, and the position of the feeler is detected by the position sensor 160, said position being stable by virtue of the feeler brake 163;

rotate the cylinder and cut the capillary tube: the cylinder 152 rotates clockwise (as seen in this FIG.) through one fourth of a turn, thereby automatically cutting off a length of capillary tube, with the cut-off end then passing in front of the suction means 157 so that the particles generated by cutting are automatically removed; and grasp the capillary tube: as soon as the capillary tube 105' is in its vertical position, i.e. coaxial with the outlet orifice 158, the end-piece of the grasping system 115 moves down into the apparatus body 170 and the feeler pusher 161 is actuated by its control 162 so as to push the length of capillary tube upwards, thereby automatically causing said length to be taken up by the end-piece 115 of the grasping system, with the capillary tube being suitable for being held by the elasticity of the end-piece, or better still by a vacuum system operating via a suction channel 115' in said endpiece.

It is interesting to observe that the nonperpendicular cut through the capillary tube gives rise to a small amount of deformation and corresponding flash, and as a result the jet of liquid is automatically deflected on leaving the central channel of the capillary tube. This makes it absolutely certain that no liquid will be projected into the eye of a patient in the form of a jet, since the jet of liquid is necessarily broken against the wall of the hole, thereby ensuring that a drop is formed.

Naturally the apparatus 150 could be made in modular form, i.e. with a cylinder including a plurality of housings 152' disposed around its axis in such a manner that rotation of said cylinder automatically causes a plurality of lengths of capillary tube to be cut by the blade C. This makes it easy to organize an automated process using the same movements for controlling the clamps, the pushers, rotation, cutting, etc. for manipulating a plurality of capillary tubes.

The above-described means make it easy to implement a method of manufacturing a plastic sterile packaging assembly in accordance with the invention, said method including the following steps:

the bottom portion of the main body for containing the liquid to be dispensed is made by blowing into the main mould, after the said main body is filled;

the flow rate restriction system is put into place substantially on the axis of the main body by means of a temporary support;

the flow rate restriction system is held in place in the head mould which, on being closed, constricts a portion of the main body around the said system.

According to a variant of the method defined above, after the stage of positioning of the flow rate restriction system, the following successive stages are additionally carried out:

the closure head is made in the sealing mould, thereby terminating the main body; and the screw cap is put into place, thereby coupling the closure head to rotate with said cap.

The sterile packaging assembly of the invention, and the associated manufacturing method, provide numerous practical advantages. The solutions made possible are much cheaper than prior art solutions mentioned in the introduction, and drops can be formed regularly without any jet when the liquid is being dispensed. It is also possible to avoid any risks due to sealing defects which could spoil the sterility of the packaging assembly. All of the embodiments described provide packaging assemblies which are easily used by the patient, even by elderly people.

The invention thus represents a very considerable progress over prior art techniques: compared with techniques including the insertion of a subassembly comprising an injected end-piece and stopper, the solution of the invention is much cheaper and avoids any risk of leakage; and compared with techniques which include forming a microchannel by means of a needle, the present solution avoids any danger of the microhole being obstructed insofar as the hole is integrated in a flow rate restriction system, and this solution also makes it easy to reuse existing bottle pack type machines, providing they already have an insertion system.

The invention is not limited to the embodiment described above, and on the contrary it extends to any variant which may use equivalent means to reproduce the essential characteristics as specified in the claims.

I claim:

1. A sterile packaging assembly for dispensing a liquid in drops, comprising a main body of plastic material having a top portion with a dispensing orifice and an outside thread for receiving a screw cap, and containing a flow rate restriction system for controlling drop formation, said system comprising a longitudinally fluted cylindrical core disposed coaxially with the main body and having its working side surface embedded in a filter which is held in position by a constricted portion of the top portion of the main body by being crimped between said constricted portion and said fluted cylindrical core at each end of the core, with the mesh size of the filter being selected as a function of the desired degree of flow rate restriction.

2. A packaging assembly according to claim 1 wherein the dispensing orifice is defined on first utilization of said packaging assembly by tearing off a closure head which surmounts a dispensing portion, said dispensing portion being described by an extension of the top portion of the main body beyond the flow rate restriction system.

3. A sterile packaging assembly for dispensing a liquid in drops, comprising a main body of plastic material having a top portion with a dispensing orifice and an outside thread for receiving a screw cap, and containing a flow rate restriction system for controlling drop formation, said system being made in the form of a porous tube having a central channel, said porous tube being disposed coaxially with the main body and having its working side surface embedded in a filter which is held in position by a constricted portion of the top portion of the main body by being crimped between said constricted portion and said porous tube at each end of the porous tube, with the mesh size of the filter being selected as a function of the desired degree of flow rate restriction.

4. A packaging assembly according to claim 3, wherein the dispensing orifice is defined on first utilization of said packaging assembly by tearing off a closure head which surmounts a dispensing portion, said dispensing portion being described by an extension of the top portion of the main body beyond the flow rate restriction system.

* * * * *